United States Patent
Gupta et al.

(10) Patent No.: US 9,064,538 B2
(45) Date of Patent: Jun. 23, 2015

(54) METHOD AND SYSTEM FOR GENERATING AT LEAST ONE OF: COMIC STRIPS AND STORYBOARDS FROM VIDEOS

(75) Inventors: Puneet Gupta, Bangalore (IN); Akshay Darbari, Allahabad (IN); Karthik Gopalakrishnan Vinmani, Bangalore (IN); Venkat Kumar Sivaramamurthy, Bengaluru (IN)

(73) Assignee: Infosys Technologies, Ltd., Bangalore (IN)

( * ) Notice: Subject to any disclaimer, the term of this patent is extended or adjusted under 35 U.S.C. 154(b) by 124 days.

(21) Appl. No.: 13/311,795

(22) Filed: Dec. 6, 2011

(65) Prior Publication Data

US 2012/0257876 A1 Oct. 11, 2012

(30) Foreign Application Priority Data

Apr. 7, 2011 (IN) .......................... 1193/CHE/2011

(51) Int. Cl.
  *H04N 5/93* (2006.01)
  *G11B 27/034* (2006.01)
  *G11B 27/10* (2006.01)
  *G11B 27/28* (2006.01)
  *G11B 27/34* (2006.01)

(52) U.S. Cl.
  CPC ............ *G11B 27/034* (2013.01); *G11B 27/105* (2013.01); *G11B 27/28* (2013.01); *G11B 27/34* (2013.01)

(58) Field of Classification Search
  USPC .......... 386/287, 244–246, 240, 253, 201, 339
  See application file for complete search history.

(56) References Cited

U.S. PATENT DOCUMENTS

| | | | |
|---|---|---|---|
| 6,278,466 B1* | 8/2001 | Chen | 345/473 |
| 6,877,134 B1* | 4/2005 | Fuller et al. | 715/202 |
| 7,929,028 B2* | 4/2011 | Heatherly et al. | 348/231.3 |
| 8,330,787 B2* | 12/2012 | Cutler | 348/14.01 |
| 8,934,652 B2* | 1/2015 | Lord et al. | 381/312 |
| 2005/0018828 A1* | 1/2005 | Nierhaus et al. | 379/202.01 |
| 2006/0114992 A1* | 6/2006 | Shibata et al. | 375/240.08 |
| 2007/0297757 A1* | 12/2007 | Kauffman et al. | 386/55 |
| 2008/0016044 A1* | 1/2008 | Hillary et al. | 707/3 |
| 2009/0087122 A1* | 4/2009 | Xu et al. | 382/277 |
| 2009/0089846 A1* | 4/2009 | Wang et al. | 725/98 |
| 2011/0267544 A1* | 11/2011 | Mei et al. | 348/700 |

* cited by examiner

*Primary Examiner* — Helen Shibru
(74) *Attorney, Agent, or Firm* — LeClairRyan, a Professional Corporation

(57) ABSTRACT

A method, a system, and a computer program product code for generating a series of still images from an input video file are provided. The series of still images may include, but are not limited to, a comic strip and a storyboard. The method includes extracting audio and visual frames from the video file. Thereafter, basic units of the video file are identified. The basic units are exposition (beginning), conflict (middle), and resolution (end). Thereafter, key frames are extracted from the basic units based on at least one of audio frames, visual frames, and a combination of the visual frames and the audio frames. Then, the extracted key frames are manipulated to output a series of still images. Subsequently, narration in the form of audio or text is attached to the still images to generate at least one of comic strips and storyboards.

33 Claims, 5 Drawing Sheets

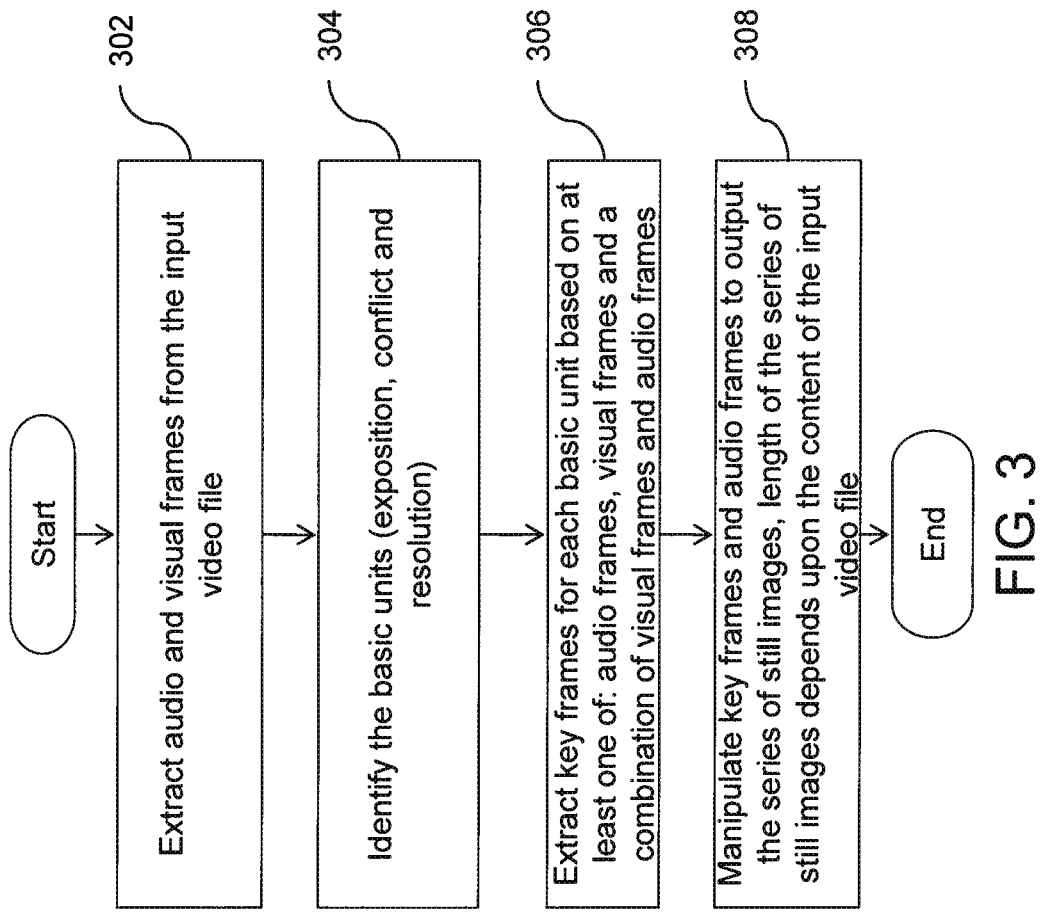

METHOD AND SYSTEM FOR GENERATING AT LEAST ONE OF: COMIC STRIPS AND STORYBOARDS FROM VIDEOS

This application claims the benefit of Indian Patent Application Filing No. 1193/CHE/2011, filed Apr. 7, 2011, which is hereby incorporated by reference in its entirety

FIELD OF THE INVENTION

The present invention relates, in general, to the field of multi-media and text analysis. More particularly, the invention relates to a method and a system for automatically generating a comic strip or a storyboard comprising still images and text and/or audio captions from an existing video or movie.

BACKGROUND

Storyboards are graphic organizers such as a series of illustrations or images. They are displayed in a sequence for the purpose of pre-visualizing a motion picture (movie), animation, motion graphic, or interactive media sequence. A comic strip is a sequence of drawings arranged in successive interrelated panels to form a narrative, often serialized, with text represented in the form of balloons, captions, or callouts.

Today, storyboards and comic strips are often drawn manually or created using a number of software applications available in the market. Typically, the creation of storyboards is one of the steps in movie creation. After creating the storyboard, they are converted into a movie. Finally, the output of this process is stored in a digital form as a video file/video. However, when implemented such process becomes cumbersome and time consuming. Further, a number of electronic information products such as digital video cameras, televisions, Compact Discs (CDs), Digital Video Discs (DVDs), and Set Top Boxes (STBs) facilitate a user to access videos.

The existing technologies or the solutions primarily focus on using the storyboards for creating movies/films. However, these technologies/solutions do not address the reverse process of generating a comic strip or a storyboard from a video such as movies/films.

In light of the foregoing challenges, there exists a need for a method and a system to generate comics and/or storyboards from existing videos with minimal or no manual intervention. The method and the system should efficiently process the existing videos to generate comic strips and/or storyboards to present them to users.

SUMMARY

An object of the present invention is to provide an efficient method and a system to process the existing videos or movies to generate comic strips and/or storyboards.

Another object of the present invention is to provide an automated method and a system for generating comic strips or storyboards from the existing videos or the movies.

Embodiments of the present invention provide a method for automatically generating a series of still images from a video file. The video file is a combination of video/visual and audio. Audio frames and visual frames are extracted from the video file. Three basic units of the video file are identified. These basic units are identified based on visual frames. The three basic units of the video file are exposition (beginning), conflict (middle), and resolution (end). In accordance with another embodiment of the present invention, the basic units may be identified based on audio frames. In accordance with further embodiment of the present invention, the basic units may be identified based on both audio frames and visual frames. Thereafter, key frames are generated based on at least one of audio frames, visual frames, and a combination of the audio frames and the visual frames.

For each of the identified basic unit, key frames are extracted. The key frames and the audio frames are manipulated to output the series of still images. Moreover, the length of the series of still images may be fixed. In accordance with another embodiment of the present invention, length of the series of still images may be decided dynamically based on the content. In accordance with another embodiment of the present invention, the user intervention may be required while generating the series of still images. For example, the user intervention may be required to improve the output. Additionally, the method includes presenting the comic strip to a user in a predefined format. The predefined format may be based on the context and ethnographic parameters, for example, culture of the user, age of the user, and gender of the user.

Embodiments of the invention provide a method for automatically generating a comic strip from a video file. As known in the art, the video file is a combination of video and audio. Accordingly, audio and visual frames are extracted from the video file. The visual frames may interchangeably be referred to as video frames. Thereafter, three basic units of the video file are identified. The basic units are identified based on at least one of audio frames, visual frames, and a combination of the audio frames and the visual frames. For each identified basic unit, key frames are extracted. The key frames and audio frames are manipulated to output a comic strip, wherein an audio comic strip is formed when an audio is attached to the key frames and/or a caption-based comic strip is formed when a text is attached to the key frames.

Embodiments of the invention provide a system for automatically generating a series of still images from a video file. The system includes an audio and video frames extraction unit for extracting audio frames and video frames from the video file. Audio and video frames extraction unit can also be referred to as Audio/Visual Frame Extraction Unit. The system further includes an audio/video processing unit for identifying basic units from the video file and extracting key frames. In accordance with a preferred embodiment of the present invention, the basic units are identified based on a combination of the audio frames and the video frames. The three basic units of the video file are exposition (beginning), conflict (middle), and resolution (end). Moreover, the system includes an output unit for manipulating the key frames and the audio frames to generate the series of still images of a predefined length. The predefined length may vary based on the content of the input video file. Further, the length of the series of still images is determined to be based on exposition, conflict and resolution. In addition to this, the system may include a table of contents generation unit. The table of contents generation unit generates a table of content for the generated comic strip and/or storyboard.

Embodiments of the invention provide a computer program product for use with a computer. The computer program product includes a computer-usable medium having a computer readable program code embodied therein for automatically generating a series of still images from a video file. The still images can be generated along with audio and/or embedded text. The computer-readable program code further includes a program instructions means for extracting audio frames and visual frames from a video file. The computer-readable program code further includes a program instructions means for identifying basic units of the video file, the basic units are identified based on at least one of audio frames, visual frames, and a combination of the audio frames and the visual frames. Moreover, the computer-readable program code includes a program instructions means for extracting key frames for each of the identified basic unit. In addition to this, the computer readable program code includes a program instruction means for manipulating the key frames and the audio frames to output the series of still images. Examples of the series of still images include, but are not limited to, comic strips and storyboards. In accordance with an embodiment of the present invention, the length of the series of still images may vary based on the content of the video file. In accordance with an embodiment of the present invention, the output, i.e., the series of the still images can be in a digital format or analog format or print format.

BRIEF DESCRIPTION OF THE DRAWINGS

Various embodiments of the invention will hereinafter be described in conjunction with the appended drawings, provided to illustrate, and not to limit, the invention, wherein like designations denote like elements, and in which:

FIG. 3 is a flowchart, illustrating a method of generating a series of still images from an input video file, in accordance with an embodiment of the present invention.

DETAILED DESCRIPTION OF THE INVENTION

The present invention provides a method and a system for automatically generating a series of still images from an input video file. The input video file may be stored in analog and/or digital form. The present invention follows an approach of combining techniques, including video summarization, video skimming, image, and audio characterization, followed by image and audio processing for comic generation. The series of still images may include, but are not limited to, a comic strip and/or a storyboard. Various modes of comic may be, but are not limited to, audio-based comic, caption (text)-based comic, and a combination of audio- and caption (text)-based comic. In accordance with an embodiment of the present invention, the text-based comic may be used for, but is not limited to, desktop applications. In accordance with another embodiment of the present invention, the audio-based comic may be used for, but not limited to, television broadcasting applications. In accordance with further embodiment of the present invention, a combination of audio- and text-based comic may be used for, but not limited to, Internet-based devices.

In particular, the main objective of the present invention is to identify key information from the input video file that helps in generating the series of still images. Audio frames and visual frames are extracted from the video file. In an embodiment of the present invention, the visual frames are converted to one of print feel images (dithering), caricature images, comic style images, and line drawing images. In another embodiment of the present invention, the visual frames may be displayed as it is. Further, three basic units are identified; and for each basic unit, key frames are extracted. The key frames are further manipulated along with audio frames to output the series of still images. Furthermore, a table of contents can be attached to the series of still images. Thus, the final output is a comic strip or a storyboard generated from the input video. In accordance with an embodiment of the present invention, storyboards and comic strips can be used interchangeably.

Figure 1:
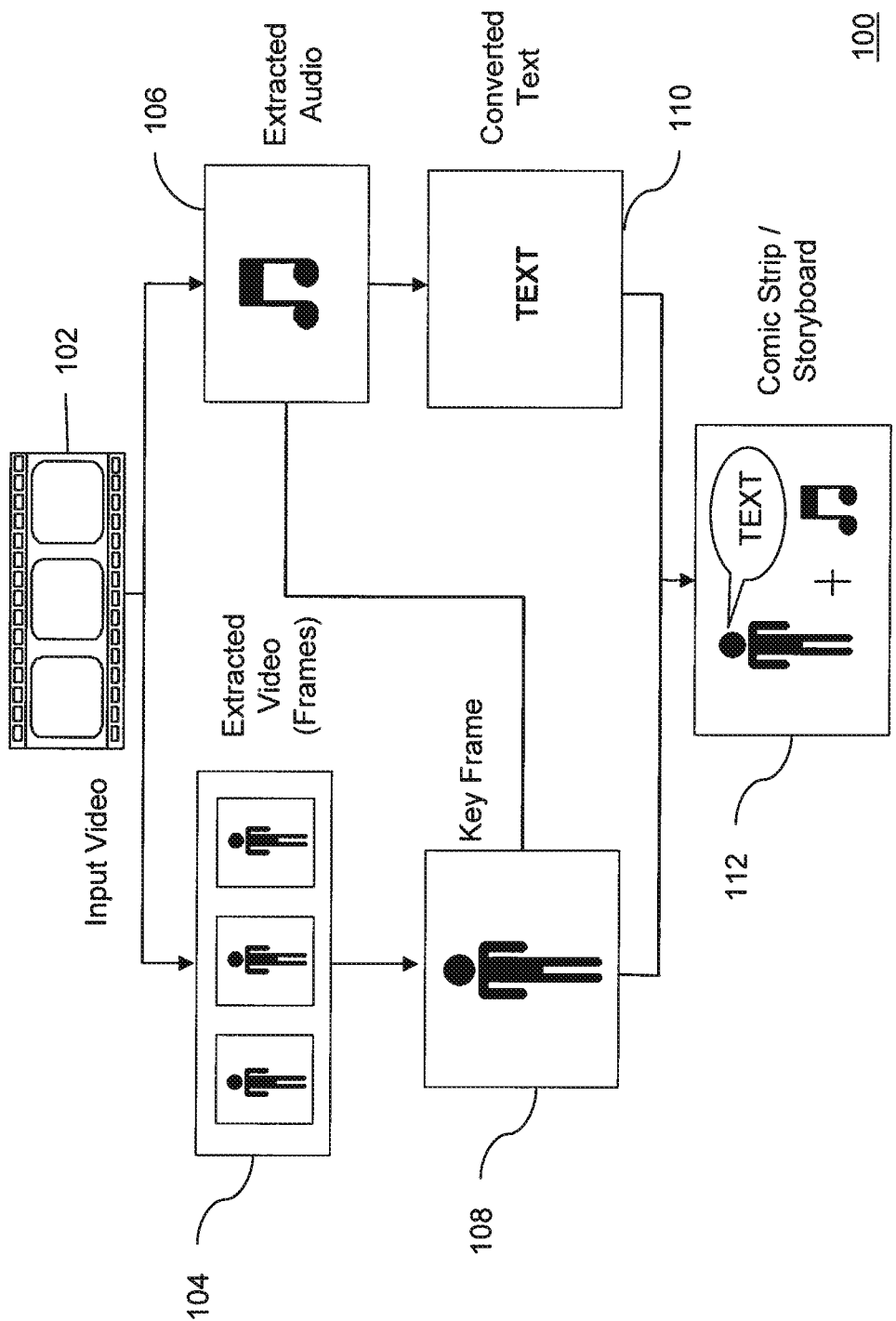
FIG. 1 is an exemplary process flow diagram, illustrating the process for generating a series of still images from an input video file, in accordance with an embodiment of the present invention.

FIG. 1 is an exemplary process flow diagram, illustrating the process for generating a series of still images from an input video file, in accordance with an embodiment of the present invention. The input for the process is a video 102. Input video 102 is a collection of frames (still images) with audio synchronization. Examples of supported video formats may include, but are not limited to, Audio Video Interleave (AVI), Windows Media Audio (WMA), FFmpeg, RealVideo, QuickTime, DivX, XVid, Nero Digital Video, CCIR, H.261, H.263, H.264, MPEG-4, M-JPEG, MPEG-1, MPEG-2, MPEG-4, MPEG-7, Ogg-Theora, and VC-1. In accordance with another embodiment of the present invention, video 102 may be in an analog format. Accordingly, an analog to digital (A/D) converter may be required. It will be appreciated by a person skilled in the art that the video formats mentioned here are for illustrative purpose only, and they do not limit the scope of the present invention in any way. A number of other formats can be supported within the scope and the spirit of the present invention.

Input video 102 is processed to extract video frames 104 and audio frames 106 from it. This extraction involves decoding and demuxing of input video 102. The present invention supports a number of formats for video frames 104 that have been described above. The present invention also supports extraction of audio frames 106 in a number of formats. Various examples of supported audio formats include, but are not limited to, mp3, Waveform Audio (WAV), OGG, Free Lossless Audio Codec (FLAG), Windows Media Audio (WMA), APE, OFR, RKAU, SHN, TTA, ADX, AC3, AAC and so forth. It will be appreciated by a person skilled in the art that the audio formats mentioned here are for illustrative purpose only, and they do not restrict the scope of the present invention in any way. A number of other formats can be supported within the scope and the spirit of the present invention.

Extracted video frames 104 are analyzed to identify the three basic units: exposition (beginning), conflict (middle), and resolution (end). Extracted video frames 104 are divided in these three sections/units. These basic units are identified based on at least one of audio frames 106, video frames 104, and a combination of video frames 104 and audio frames 106. Further, the three units help in deciding the number of frames which should go in each one of them. The three units are defined in an appropriate ratio. For example, the conclusion or the result cannot be given more emphasis than the plot or the body. For each of these basic units, a scene is derived from the video frame. Thereafter, groups are formed from the scene. Then, shot detection is performed for each group, and key frames 108 are extracted from the shots.

In accordance with an embodiment of the present invention, the process of extracting key frames 108 involves manipulation of audio and visual cues. Visual cues such as scene change, clustering, motion, and camera attention are used. Audio cues such as speech vs. music, pause, tempo, energy, and frequency can be used in conjunction with video cues.

The process of extraction of key frames 108 from video frames 104 is well known in the art. A number of algorithms are available in the art that facilitate the extraction of key frames 108 from input video 102. It should be noted that any other suitable algorithm to extract key frames 108 from input video 102 can also be used without altering the scope of the present invention.

In accordance with an embodiment of the present invention, key frames 108 may be extracted from audio frames 106, and a combination of audio frames 106 and video frames 104 (not shown in the figure). The key frames 108 are repeated when video frames 104 or audio frames 106 are of huge size.

In another embodiment of the present invention, extracted audio frames 106 is further processed to identify speech from it. The identified speech is converted into text 110. Speech to text conversion is also well known in the art. In a preferred embodiment of the present invention, the text may be obtained by performing audio-to-text conversion on audio frames 106 by using audio-to-text conversion unit. Any suitable algorithm to convert speech to text can be used without altering the scope of the present invention. Further, significant audio clues that are not speech related can also be converted into text. Examples of such audio cues include significant ambient noises such as explosions honking or braking of vehicles, and sounds created by animals. Any form of audio that is associated with a key frame is selected to be converted into text 110 and will have significance in the final output, i.e., the comic strip or the storyboard.

In accordance with an embodiment of the invention, a user is given an option to select which form of key frames 108 he/she requires to be represented. The following options are supported by the invention: but not limited to,—presentation of scenes as in the original video, caricatures or cartoonized, or line drawing or print feel form of the original video.

Key frames 108 thus formed are manipulated along with extracted audio 106 or converted text 110 to generate a comic or a storyboard 112. In an embodiment of the present invention, the comic strip is a combination of key frames 108 and converted text 110. In this case, captions can be attached to key frames 108 in form of callouts or any other similar method that represents the dialogue (dialog) associated with a character in the key frame. Further, comic or storyboard 112 can be represented in the form of a printed book. In another embodiment of the present invention, extracted audio 106 can be directly attached to key frames 108. In this case, the comic or storyboard 112 can be viewed on a computer, i.e., in soft form. In accordance with an embodiment of the present invention, the length of comic or storyboard 112 may vary based on the content of the input video file 102.

In a preferred embodiment of the present invention, the series of still images may include, but are not limited to, a comic strip, a storyboard, an audio-based comic, and a caption-based comic. The caption-based comic may also be referred to as text-based comic.

In an embodiment of the present invention, the dialog of the character from the series of still images is depicted by at least one of zooming-in on the character, creating a halo effect around the character for an audio-based comic. In another embodiment, the dialog of character from the series of still images is depicted by using a callout for a caption-based comic.

In accordance with an embodiment of the present invention, audio-based comic and caption-based comic will be described herein. For audio-based comic, the audio corresponding to a video segment/file is attached to the corresponding key frame along with the time. Further, the audio may be refined, for example, shortened to include the relevant part. In accordance with another embodiment, the audio may be kept as it is. For caption-based comic, audio data is analyzed to extract meaningful short text which can be used as caption for a key frame. Further, for audio-/caption-based comic; context is derived to find the focus area. The context is derived by identifying the speaker (characters). Speaker identification needs to be performed to associate audio with characters, and this is achieved by generating a speaker dialogue graph. The speaker dialogue graph is generated for all the characters involved in the key frames and then analysis is performed to identify voice texture for each character to set the context. The context is then attached in the following way: in case of audio-based comic, that character in the frame is highlighted to signify that he or she is speaking; and in case of caption-based comic, the extracted text is attached using callouts. To further elaborate the process of callouts, an example has been described, where the key frames contain two characters such as A and B. To identify the placement of callouts in case of two characters, firstly presence of particular character based on the voice texture throughout the input video file is identified. Thereafter, a step of identifying the voice texture corresponding to a particular character is performed. Subsequently, the callouts are generated and then associated.

Figure 2:
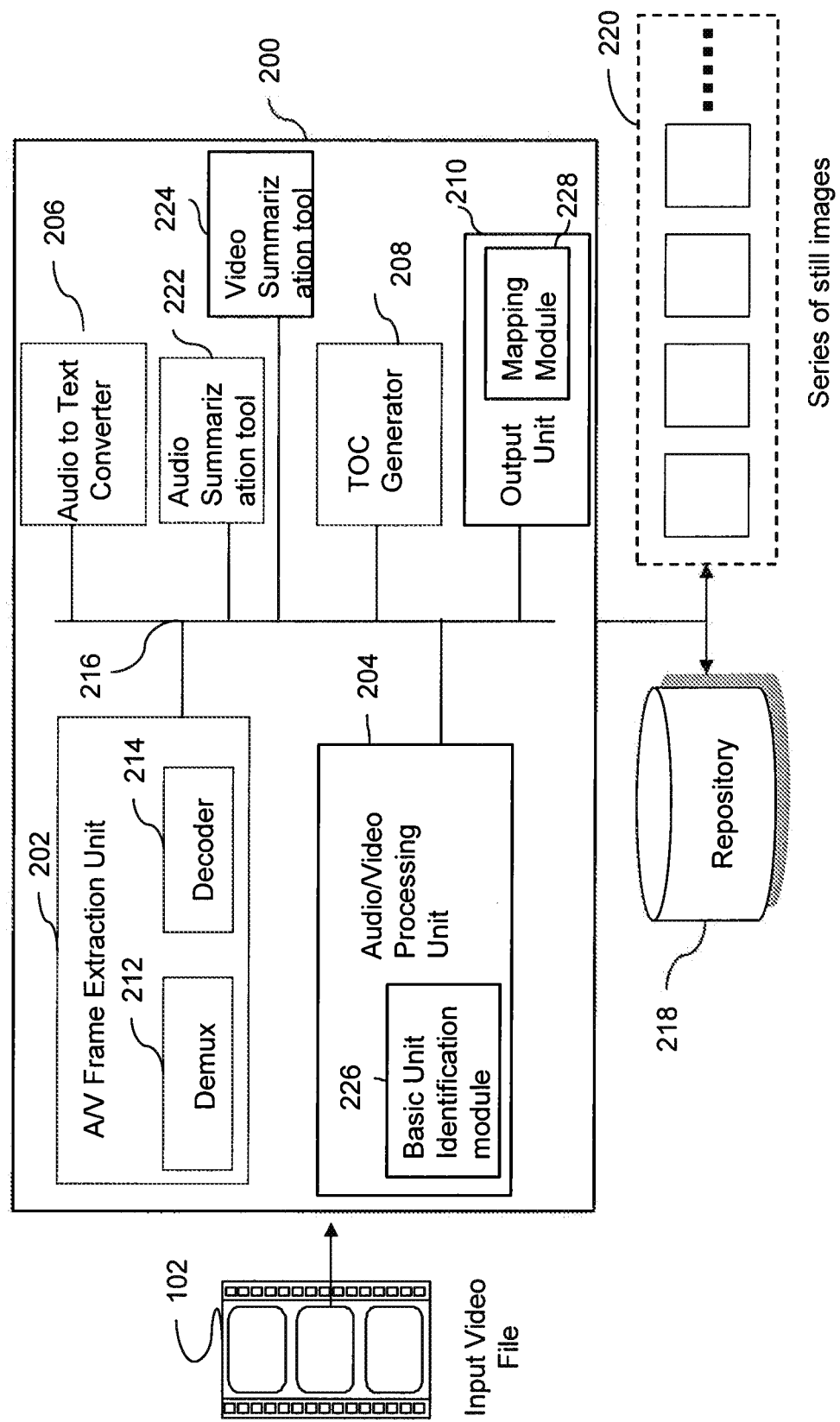
FIG. 2 is a block diagram, illustrating a system for generating a series of still images from an input video file, in accordance with an embodiment of the present invention.

FIG. 2 is a block diagram, illustrating a system for generating a series of still images from an input video file, in accordance with an embodiment of the present invention. System 200 includes an Audio/Visual (NV) Frame Extraction Unit 202, an Audio/Video Processing Unit 204, an Audio to Text Converter 206, an audio summarization tool 222, video summarization tool 224, a Table of Contents (TOC) Generator 208, and an Output Unit 210. Audio/Visual Frames Extraction Unit 202 further includes a Demultiplexer (Demux) 212 and a Decoder 214. Audio/Video Processing Unit 204 further includes basic unit identification module 226. Output Unit 210 includes mapping module 228. Further, Audio/Visual Frame Extraction Unit 202, Audio/Video Processing Unit 204, Audio to Text Converter 206, Table of Contents (TOC) Generator 208, and Output Unit 210 are connected through a Bus 216. Moreover, Audio/Visual Frame Extraction Unit 202 may include an audio and/or video decoder.

System 200 optionally includes a repository 218. Repository stores an information relating to the input and the output as described above in FIG. 1. For example, repository 218 stores input video file, audio frames, video frames, key frames, a comic, a storyboard, and the like. Repository 218 can be a database or a storage device such as a memory. In various embodiments of the present invention, repository 218 can also be separate from system 200, and it does not alter the scope of the invention in any way.

System 200 processes an input video such as input video 102 to generate a series of still images 220. The input video is demultiplexed by demultiplexer 212 and is subsequently decoded by decoder 214. Audio frames and visual frames are thus extracted from the input video at Audio/Visual frame extraction unit 202.

Audio/Video processing unit 204 analyzes extracted video frames such as extracted video frames 104 to identify the three basic units: exposition (beginning), conflict (middle), and resolution (end). In particular, basic unit identification module 226 identifies the basic units of the video file. In accordance with an embodiment of the present invention, basic unit identification module 226 may not form a part of audio/video processing unit 204 and still performs the same functionalities as described above. Audio/Video processing unit 204 further divides the extracted video frames into the three sections. For each of these basic units, audio/video processing unit 204 derives a scene. It further groups the scenes, conducts shot detection for each group, and extracts key frames from the shots. In accordance with an embodiment of the present invention, the key frames may be extracted based on at least one of audio frames, video frames, and a combination of the audio frames and the video frames.

The audio extracted by audio/visual frame extraction unit 202 is processed by the audio to text converter 206 and text corresponding to each key frame is generated. This process has been explained above in detail in conjunction with FIG. 1 and will further be explained in FIGS. 4a and 4b. Further, audio summarization tool 222 summarizes the audio frames generated from the input video file. Video summarization tool 224 summarizes the video frames generated from the input video file.

TOC generator 208, in conjunction with audio/video processing unit 204, generates a table of contents for a given series of still images. The table of contents is generated considering the basic units and the content of the comic strip or storyboard. In accordance with an embodiment of the present invention, the table of content is generated based on the final comic output.

In accordance with an embodiment of the present invention, dialog processing is described herein. Once all the processing is performed by audio/visual frame extraction unit 202, the resulted key frames are further classified in clusters based on distinct scene, shot, scene-transition, and/or time. The clusters are then processed (applying text analysis over these clusters and/or identifying few key objects in the clusters to give meaningful title) individually to identify a title representing the scene. Video processing requires to identify the objects present in the cluster or to identify the context using a propriety or standard algorithm. The title can be further pruned manually. For example, audio-based dialog processing leads to a title, "Arrival of the detective at the crime site". In another example, video-based dialog processing leads to "Sunset". In yet another example, audio- and video-based dialog processing together yield a result "Arrival of the detective at the crime site at sunset". Additionally, this technique can also be used to generate index for the comic, based on scene, character appearance, timeline, history, dialog, etc.

TOC and index will result in indexing and would help the reader skip or reach the desired part of the comic instantaneously.

Output unit 210 manipulates the key frames and extracted audio and/or converted text to form a comic strip or a storyboard. More specifically, mapping module 228 performs mapping of the key frames and audio and/or text. For example, key frames may be associated with the audio to generate the still images. In another example, key frames may be attached with the text to generate the still images. In yet another example, key frames may be attached with the audio and the text both to generate the still images. Output unit 210 may further perform one or more functions, but are not limited to, encoding and synchronization. In accordance with another embodiment of the present invention, mapping module may not form a part of output unit 210, and output unit 210 is configured with more functionalities than mapping module 228.

In an embodiment of the present invention, user input is sought to decide the narration type for the comic strip. Based on the user input, narration is attached to the key frames. In various embodiments of the present invention, the narration is attached in form of audio and/or captions (text). In case of a caption-based comic, context needs to be derived to find the focus area. In other words, speaker identification needs to be performed to associate audio with characters (speakers). This is achieved by generating a speaker-dialogue graph for each of the characters in the video. The speaker-dialogue/dialog graphs are analyzed using the voice texture and presence of a character in a visual frame. Once an analysis is performed, ambiguity is resolved for all the frames, and, subsequently, final mapping is performed.

A separate context derivation unit (not shown in the figure) that is configured to execute the steps mentioned above can be used in conjunction with output unit 210. It should be noted that the method for setting context described here is for illustrative purpose only, and it does not restrict the scope of the invention in any way. Numerous other methods of associating voice with the speaker are well known and can be used without deviating from the scope of the invention.

In case of a comic or storyboard wherein audio is attached to the key frames, a character in a particular frame is highlighted to signify that he or she is speaking. In accordance with another embodiment, the character is left as it is since it depends on the reader imagination to form the association. Similarly, in case of a comic or storyboard wherein captions (text) are used, the extracted text is represented on the key frame by using a callout. Callouts are placed after identifying a non-blocking unimportant area. In another embodiment of the present invention, the extracted text can be shown at the bottom or on top of the frame, and the speaker can be highlighted in the still frame. Any other suitable method may also be used.

FIG. 3 is a flowchart, illustrating a method of generating a series of still images from an input video file, in accordance with an embodiment of the present invention. The input video is a collection of frames (still images) with audio synchronization. The input video may be in the digital or analog form. At 302, audio and visual frames are extracted from the input video file. This involves demultiplexing and decoding of the input video. As explained earlier, the present invention supports extraction of audio and visual frames in a number of formats. In accordance with an embodiment of the present invention, the method includes a step for generating key frames based on at least one of audio frames, visual frames, and a combination of the audio frames and the visual frames.

At 304, the extracted video frames are analyzed to identify the three basic units: exposition (beginning), conflict (middle), and resolution (end). The extracted video frames are divided in these three sections. Further, the three units help in deciding the number of frames should go in each one of them. The three units are defined in an appropriate ratio. For example, the conclusion or the result cannot be given more emphasis than the plot or the body. For each of these basic units, at 306, key frames are extracted from the shots. The process for key frame extraction is explained in detail in conjunction with FIGS. 1 and 2. The key frames are extracted based on at least one of audio frames, visual frames, and a combination of visual frames and audio frames.

In accordance with an embodiment of the present invention, the process of extracting key frames 108 involves the manipulation of audio and visual cues. Visual cues such as scene change, clustering, motion, and camera attention are used. Audio cues such as speech vs. music, pause, tempo, energy, and frequency can be used along with video cues.

At 308, key frames and audio frames are manipulated to form the series of still images. The series of still images can be used in the form of a comic strip or a storyboard. This is explained in the forthcoming description. The length of the series of still images depends upon the content of the input video file.

In accordance with an embodiment of the present invention, key frames can be derived individually based on 304 and 306.

Figure 4A:
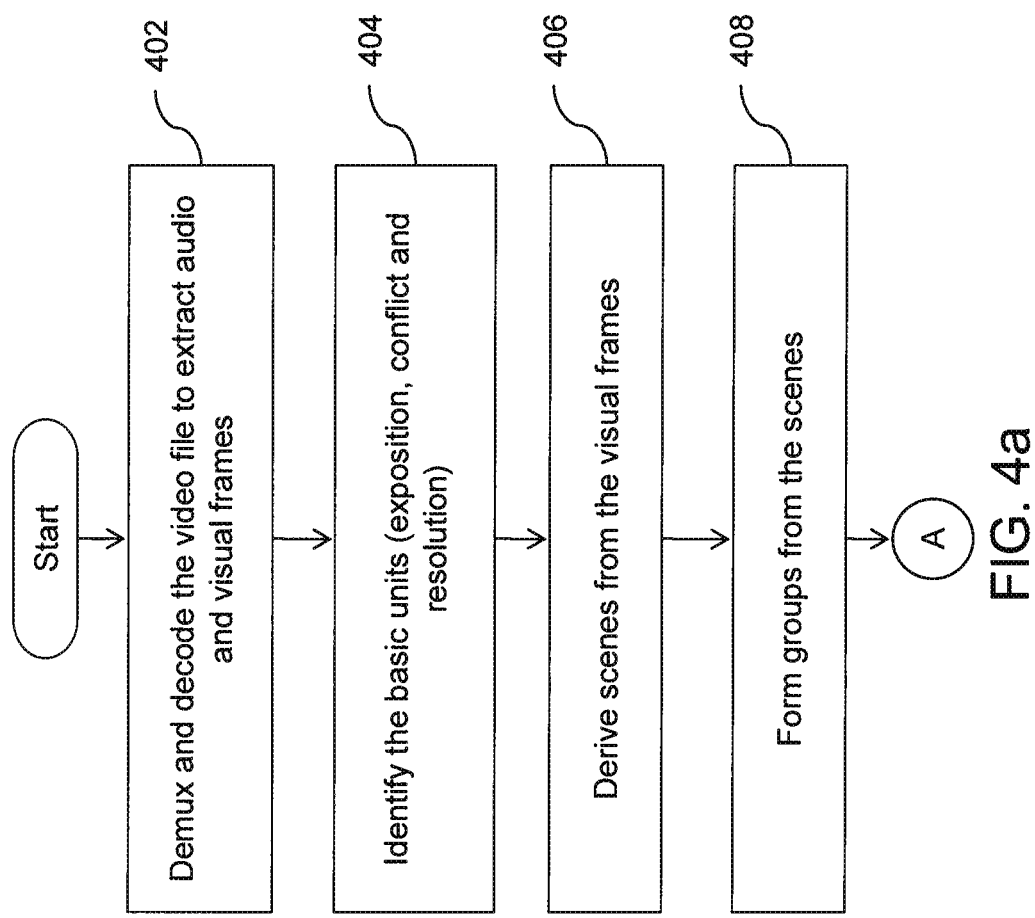
FIGS. 4a and 4b are flowcharts illustrating a detailed method of generating a series of still images from an input video file, in accordance with another embodiment of the present invention.
Figure 4B:
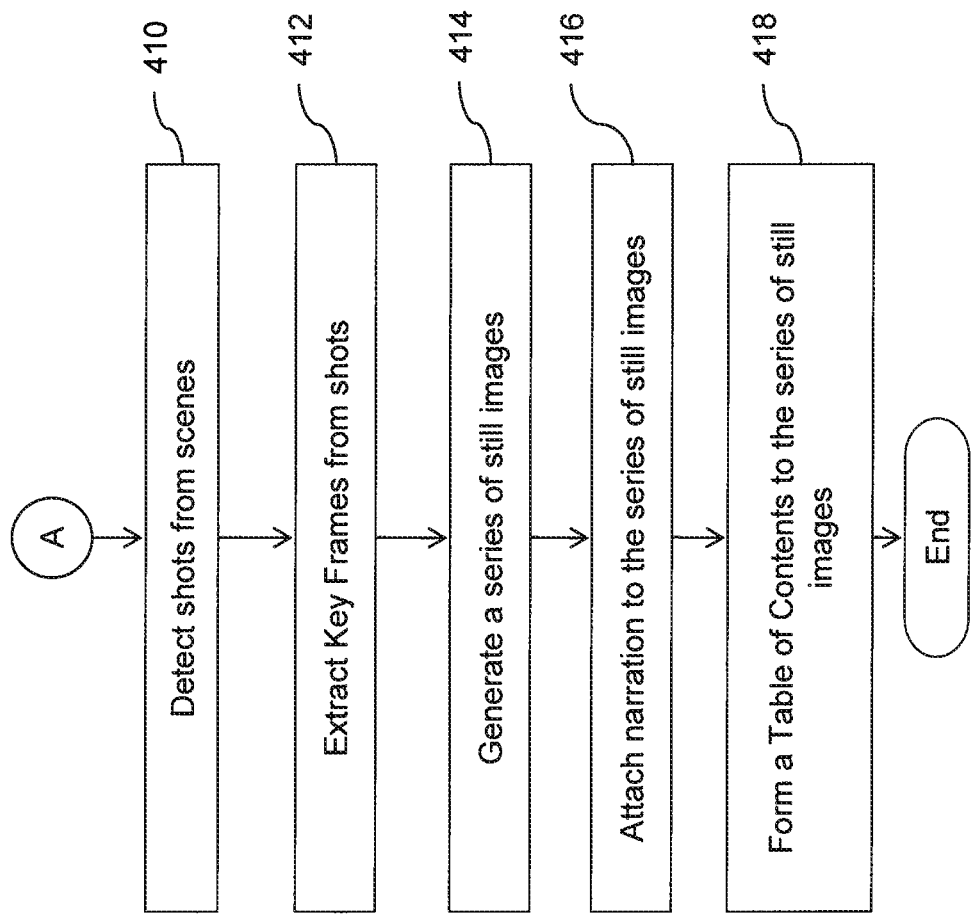

FIGS. 4a and 4b are flowcharts illustrating a detailed method for generating a series of still images from an input video file, in accordance with another embodiment of the present invention. The input video is a collection of frames (still images), with audio synchronization. The present invention supports a number of formats for the input video, as explained in detail in conjunction with FIG. 1.

At 402, input video is demultiplexed and decoded to extract the audio and visual frames from it. The present invention supports the extraction of audio and visual frames in a number of formats, as explained above.

At 404, the extracted video frames are analyzed to identify the three basic units: exposition (beginning), conflict (middle), and resolution (end). The extracted video frames are divided in these three sections. Further, the number of frames for exposition, conflict, and resolution is decided based on a predefined length of the series of still images. For each of these basic units, a scene is derived from the video frame at 406. At 408, groups are formed from the scenes. At 410, shot detection is carried out for each group, and key frames 108 are extracted from the shots at 412. In accordance with a preferred embodiment of the present invention, the key frames are extracted based on a combination of audio frames and visual frames. In accordance with an embodiment of the present invention, number of the key frames for exposition (beginning), conflict (middle), and resolution (end) are decided based on the length of the comic.

In accordance with an embodiment of the present invention, the process of extracting key frames involves manipulation of audio and visual cues. Visual cues such as scene change, clustering, motion, and camera attention are used. Audio cues such as speech vs. music, pause, tempo, energy, and frequency can be used in conjunction with video cues.

The process of extraction of key frames from the video frames is well known in the art. A number of algorithms are available in the art that facilitate the extraction of key frames from the input video. It should be noted that any other suitable algorithm to extract key frames from input video can also be used without altering the scope of the present invention. After extracting key frames, a series of still images are generated at 414. The series of still images may be such as a comic, a storyboard, and other graphic mediums.

In another embodiment of the present invention, extracted audio is further processed to identify speech from it. The identified speech is converted into text. Speech to text conversion is also well known in the art. Any suitable algorithm to convert speech to text can be used. At 416, narration is attached to the series of still images. Narration can be attached to the key frames in form of a callout or any other similar method for showing the dialogue associated with a character in the key frame. In another embodiment of the present invention, extracted audio can be directly attached to the key frames. Thus, a comic strip or a storyboard is formed at the end of 416. Lastly, the comic strip is presented to a user in a predefined format. The predefined format may be based on context and ethnographic parameters, for example, culture of the user, age of the user, and gender of the user. In accordance with an embodiment of the present invention, the method may further include deriving the context of the comic strip.

At 418, a table of contents is formed and is attached to the comic strip or storyboard.

In accordance with an embodiment of the present invention, the invention may be implemented in the form of intelligent software having the capability of automatically generating the series of still images. In accordance with another embodiment of the present invention, further pruning can be done manually while generating the series of still images.

The present invention described above has numerous advantages. The present invention provides an automated approach of generating a series of still images from a video file. The series of still images can be comics or storyboards. The automatic generation of the series of still images requires no/minimal manual intervention. Thereby, turn around time has been reduced. Hence, the present invention facilitates an efficient approach for generating the comics and/or the storyboards. The present invention further generates a table of content (TOO) for the generated comics or the storyboards. Additionally, no functional/technical skill is required for a person to create an aesthetic output, thereby bringing in creativity to the overall process.

The method and the system for generating at least one of comic strips or story boards from videos, or any of its components, as described in the present invention, may be embodied in the form of a computer system. Typical examples of a computer system include a general-purpose computer, a programmed microprocessor, a micro-controller, a peripheral integrated circuit element, and other devices or arrangements of devices that are capable of implementing the steps that constitute the method for the present invention.

The computer system typically comprises a computer, an input device, and a display unit. The computer typically comprises a microprocessor, which is connected to a communication bus. The computer also includes a memory, which may include a Random Access Memory (RAM) and a Read Only Memory (ROM). Further, the computer system comprises a storage device, which can be a hard disk drive or a removable storage drive such as a floppy disk drive and an optical disk drive. The storage device can be other similar means for loading computer programs or other instructions into the computer system.

The computer system executes a set of instructions (or program instructions) that are stored in one or more storage elements to process input data. These storage elements can also hold data or other information, as desired, and may be in the form of an information source or a physical memory element present in the processing machine. Exemplary storage elements include a hard disk, a DRAM, an SRAM, and an EPROM. The storage element may be external to the computer system and connected to or inserted into the computer, to be downloaded at or prior to the time of use. Examples of such external computer program products are, but not limited to, computer-readable storage mediums such as CD-ROMS, Flash chips, and floppy disks.

The set of instructions may include various commands that instruct the processing machine to perform specific tasks such as the steps that constitute the method for the present invention. The set of instructions may be in the form of a software program. The software may be in various forms such as system software or application software. Further, the software may be in the form of a collection of separate programs, a program module with a large program, or a portion of a program module. The software may also include modular programming in the form of object-oriented programming. The software program that contains the set of instructions (a program instruction means) can be embedded in a computer program product for use with a computer, the computer program product comprising a computer-usable medium with a computer readable program code embodied therein. The processing of input data by the processing machine may be in response to users' commands, results of previous processing, or a request made by another processing machine.

The modules described herein may include processors and program instructions that are used to implement the functions of the modules described herein. Some or all the functions can be implemented by a state machine that has no stored program instructions, or in one or more Application-Specific Integrated Circuits (ASICs), in which each function or some combinations of some of the functions are implemented as custom logic.

While the various embodiments of the invention have been illustrated and described, it will be clear that the invention is not limited only to these embodiments. Numerous modifications, changes, variations, substitutions, and equivalents will be apparent to those skilled in the art, without departing from the spirit and the scope of the invention.

What is claimed is:

1. A method for generating a series of still images from a video file, the method comprising:
    extracting, by a multimedia management computing device, a plurality of audio frames and a corresponding plurality of visual frames from a video file;
    identifying, by the multimedia management computing device, a plurality of basic units of the video file, each of the plurality of basic units comprising a respective subset of the plurality of visual frames and a corresponding subset of the plurality of audio frames;
    extracting, by the multimedia management computing device, for each of the plurality of basic units, one or more key visual frames from the subset of the plurality of visual frames and corresponding one or more key audio frames from the subset of the plurality of audio frames;
    generating, by the multimedia management computing device, a speaker dialogue graph based on the one or more key audio frames;
    identifying, by the multimedia management computing device, one or more characters based on the generated speaker dialogue graph;
    converting, by the multimedia management computing device, the one or more key visual frames into a series of still images and the corresponding one or more key audio frames into text corresponding to the one or more characters; and
    outputting, by the multimedia management computing device, the series of still images and the text corresponding to the one or more characters.

2. The method according to claim 1, wherein the extracting the plurality of audio frames and the plurality of visual frames further comprises demultiplexing and decoding the video file.

3. The method according to claim 1, wherein the extracting the one or more key visual frames further comprises:
    deriving, by the multimedia management computing device, scenes from the plurality of basic units;
    forming, by the multimedia management computing device, groups from the scenes; and
    detecting, by the multimedia management computing device, shots from the groups, wherein the one or more key frames are extracted from the shots.

4. The method according to claim 1 further comprising:
    attaching, by the multimedia management computing device, narration to the series of still images; and
    generating, by the multimedia management computing device, a table of contents based on the series of still images.

5. The method according to claim 1, wherein the series of still images comprises a comic strip, a storyboard, an audio-based comic, or a caption-based comic.

6. The method according to claim 1, wherein a length of the series of still images is fixed or determined dynamically.

7. The method according to claim 1, wherein the plurality of basic units of the video file comprise an exposition, a conflict, or a resolution, and a number of frames for each of the plurality of basic units is determined based on a predefined length of the series of still images.

8. The method according to claim 1, wherein the converting further comprises:
    converting, by the multimedia management computing device, the one or more key visual frames to print feel images, caricature images, line drawing images, or comic style images.

9. The method according to claim 1, further comprising:
    generating, by the multimedia management device, a dialogue of the one or more characters, wherein the dialogue is depicted by a visual effect comprising zooming-in on the one or more characters, creating a halo effect around the one or more characters, or a callout.

10. The method according to claim 1 further comprising:
    identifying, by the multimedia management computing device, one or more voice textures for each of the one or more key audio frames based on the speaker dialogue graph, wherein the one or more voice textures correspond to the one or more characters; and
    deriving, by the multimedia management computing device, a context for each of the one or more key audio frames based on the identified one or more voice textures.

11. The method according to claim 1 wherein the extracting the one or more key visual frames from the subset of the plurality of visual frames and corresponding one or more key audio frames from the subset of the plurality of audio frames is based on one or more visual cues comprising a scene change, clustering motion, or camera attention.

12. A multimedia management computing device, comprising:
    at least one processor;
    a memory coupled to the processor and configured to be capable of executing programmed instructions comprising and stored in the memory to:
        extract a plurality of audio frames and a corresponding plurality of visual frames from a video file;
        identify a plurality of basic units of the video file, each of the plurality of basic units comprising a respective subset of the plurality of visual frames and a corresponding subset of the plurality of audio frames;
        extract, for each of the plurality of basic units, one or more key visual frames from the subset of the plurality of visual frames and corresponding one or more key audio frames from the subset of the plurality of audio frames;
        generate a speaker dialogue graph based on the one or more key audio frames;
        identify one or more characters based on the generated speaker dialogue graph;
        convert the one or more key visual frames into a series of still images and the corresponding one or more key audio frames into text corresponding to the one or more characters; and
        output the series of still images and the text corresponding to the one or more characters.

13. The device according to claim 12, wherein the extracting the plurality of audio frames and the plurality of visual frames further comprises demultiplexing and decoding the video file.

14. The device according to claim 12, wherein the extracting the one or more key visual frames further comprises:
    deriving scenes from the plurality of basic units;
    forming groups from the scenes; and detecting shots from the groups, wherein the one or more key frames are extracted from the shots.

15. The device according to claim 12, wherein the processor is further configured to execute programmed instructions comprising and stored in the memory to:
attach narration to the series of still images; and
generate a table of contents based on the series of still images.

16. The device according to claim 12, wherein the series of still images comprises a comic strip, a storyboard, an audio-based comic, or a caption-based comic.

17. The device according to claim 12, wherein a length of the series of still images is fixed or determined dynamically.

18. The device according to claim 12, wherein the plurality of basic units of the video file comprise an exposition, a conflict, or a resolution and a number of frames for each of the plurality of basic units is determined based on a predefined length of the series of still images.

19. The device according to claim 12, wherein the converting further comprises converting the one or more key visual frames to print feel images, caricature images, line drawing images, or comic style images.

20. The device according to claim 12, wherein processor is further configured to be capable of executing programmed instructions comprising and stored in the memory to:
generate a dialogue of the one or more characters, wherein the dialogue is depicted by a visual effect comprising zooming-in on the one or more characters character, creating a halo effect around the one or more characters, or a callout.

21. The device according to claim 12, wherein the processor is further configured to execute programmed instructions comprising and stored in the memory to:
identify one or more voice textures for each of the one or more key audio frames based on the speaker dialogue graph, wherein the one or more voice textures correspond to the one or more characters; and
derive a context for each of the one or more key audio frames based on the identified one or more voice textures.

22. The device according to claim 12 wherein the extracting the one or more key visual frames from the subset of the plurality of visual frames and corresponding one or more key audio frames from the subset of the plurality of audio frames is based on one or more visual cues comprising a scene change, clustering motion, or camera attention.

23. A non-transitory computer readable medium having stored thereon instructions for generating a series of still images comprising machine executable code which when executed by at least one processor, causes the processor to perform steps comprising:
extracting a plurality of audio frames and a corresponding plurality of visual frames from a video file;
identifying a plurality of basic units of the video file, each of the basic units comprising a respective subset of the plurality of visual frames and a corresponding subset of the plurality of audio frames;
extracting, for each of the plurality of basic units, one or more key visual frames from the subset of the plurality of visual frames and corresponding one or more key audio frames from the subset of the plurality of audio frames;
generating a speaker dialogue graph based on the one or more key audio frames;
identifying one or more characters based on the generated speaker dialogue graph;
converting the one or more key visual frames into a series of still images and the corresponding one or more key audio frames into text corresponding to the one or more characters; and
outputting the series of still images and the text corresponding to the one or more characters.

24. The medium according to claim 23, wherein extracting the plurality of audio frames and the plurality of visual frames further comprises demultiplexing and decoding the video file.

25. The medium according to claim 23, wherein the extracting the one or more key frames further comprises:
deriving scenes from the plurality of basic units;
forming groups from the scenes; and
detecting shots from the groups, wherein the one or more key frames are extracted from the shots.

26. The medium according to claim 23, further having stored thereon instructions that when executed by the processor causes the processor to perform steps further comprising:
attaching narration to the series of still images; and
generating a table of contents based on the series of still images.

27. The medium according to claim 23, wherein the series of still images comprises a comic strip, a storyboard, an audio-based comic, or a caption-based comic.

28. The medium according to claim 23, wherein a length of the series of still images is fixed or determined dynamically.

29. The medium according to claim 23, wherein the plurality of basic units of the video file comprise an exposition, a conflict, or a resolution and a number of frames for each of the plurality of basic units is determined based on a predefined length of the series of still images.

30. The medium according to claim 23, wherein the converting further comprises converting the one or more key visual frames to print feel images, caricature images, line drawing images or comic style images.

31. The medium according to claim 23, further having stored thereon instructions that when executed by the processor cause the processor to perform steps further comprising:
generating a dialogue of the one or more characters, wherein the dialogue is depicted by a visual effect comprising zooming-in on the one or more characters, creating a halo effect around the one or more characters, or by a callout.

32. The medium according to claim 23, further having instructions that when executed by the processor causes the processor to perform steps further comprising:
identifying one or more voice textures for each of the one or more key audio frames based on the speaker dialogue graph, wherein the one or more voice textures correspond to the one or more characters; and
deriving a context for each of the one or more key audio frames based on the identified one or more voice textures.

33. The medium according to claim 23 wherein the extracting the one or more key visual frames from the subset of the plurality of visual frames and corresponding one or more key audio frames from the subset of the plurality of audio frames is based on one or more visual cues comprising a scene change, clustering motion, or camera attention.

* * * * *